United States Patent [19]

Kramer et al.

[11] 4,312,214
[45] Jan. 26, 1982

[54] KNOCK DETECTOR FOR INTERNAL COMBUSTION ENGINE

[75] Inventors: Dennis M. Kramer, Rochester; John C. Dock, Warren, both of Mich.

[73] Assignee: Chrysler Corporation, Highland Park, Mich.

[21] Appl. No.: 160,268

[22] Filed: Jun. 17, 1980

[51] Int. Cl.³ .............................................. G01M 23/22
[52] U.S. Cl. ...................................................... 73/35
[58] Field of Search ..................... 73/35; 123/425, 435

[56] References Cited

U.S. PATENT DOCUMENTS

| | | |
|---|---|---|
| 3,822,583 | 7/1974 | Keller et al. ............................. 73/35 |
| 4,279,143 | 7/1981 | Gwipand ................................. 73/35 |

Primary Examiner—James J. Gill
Attorney, Agent, or Firm—Newtson & Dundas

[57] ABSTRACT

A knock detector for an internal combustion engine comprises a resonantly tuned knock sensor mounted on the engine, a variable gain amplifier for amplifying the signal from the knock sensor, knock and reference channels which are operatively coupled with the output of the variable gain amplifier to develop respective knock and reference channel signals, and a comparator for comparing the signal of one channel against the signal of the other channel. The gain of the variable gain amplifier, in general, is an inverse function of engine speed. The amplified signal from the variable gain amplifier is gated to a peak detector of the reference channel circuit during absence of any appreciable engine knock to develop a reference signal representing background noise. The knock channel detects peaks of the amplifier output signal, and the comparator compares the two peak detected signals to provide a knock signal when a predetermined relationship between the two is attained.

6 Claims, 7 Drawing Figures

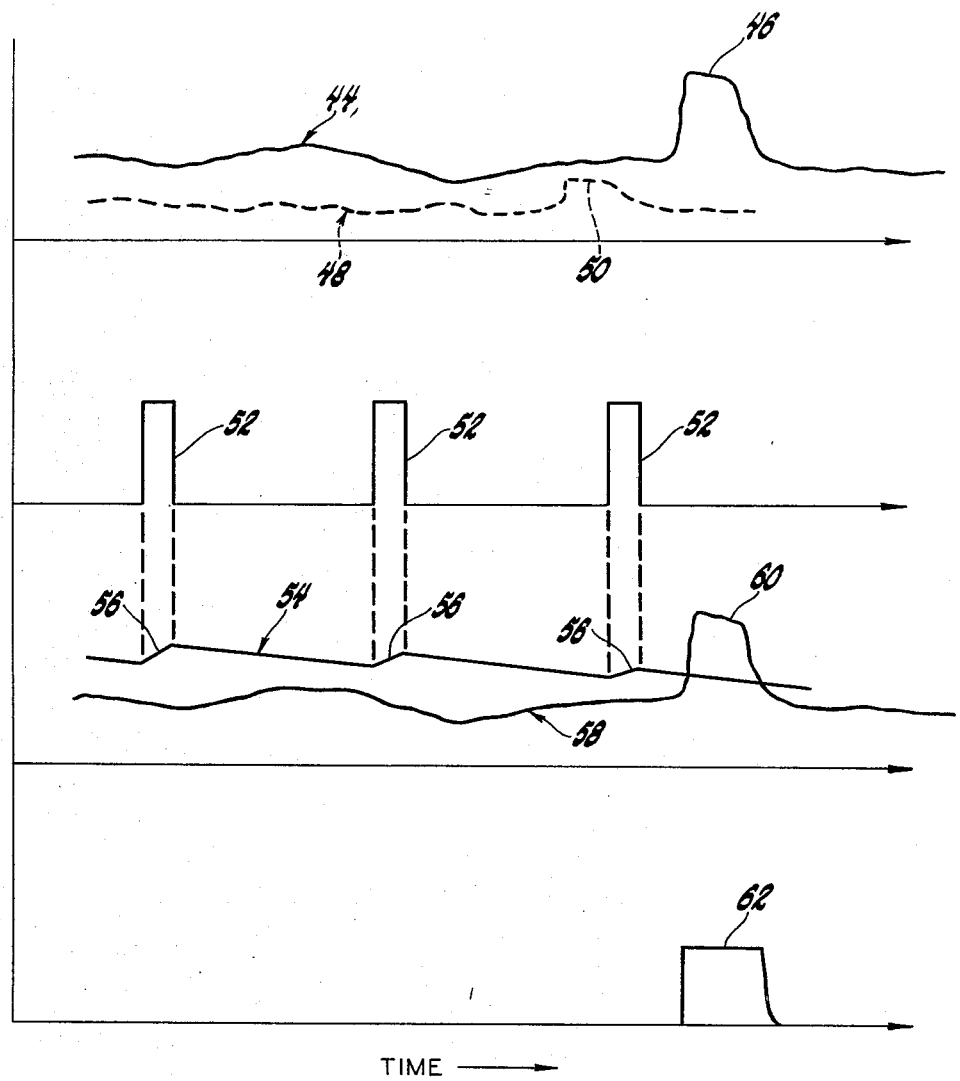
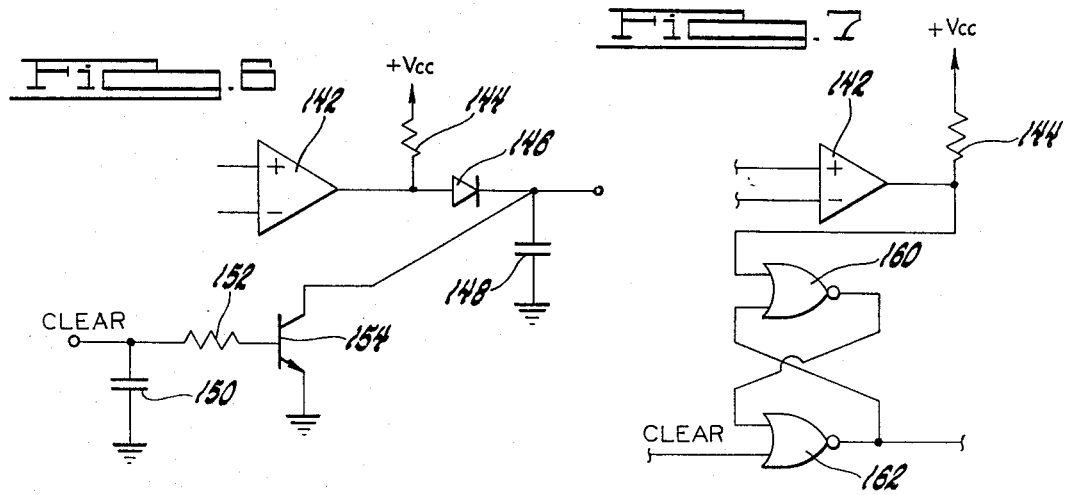

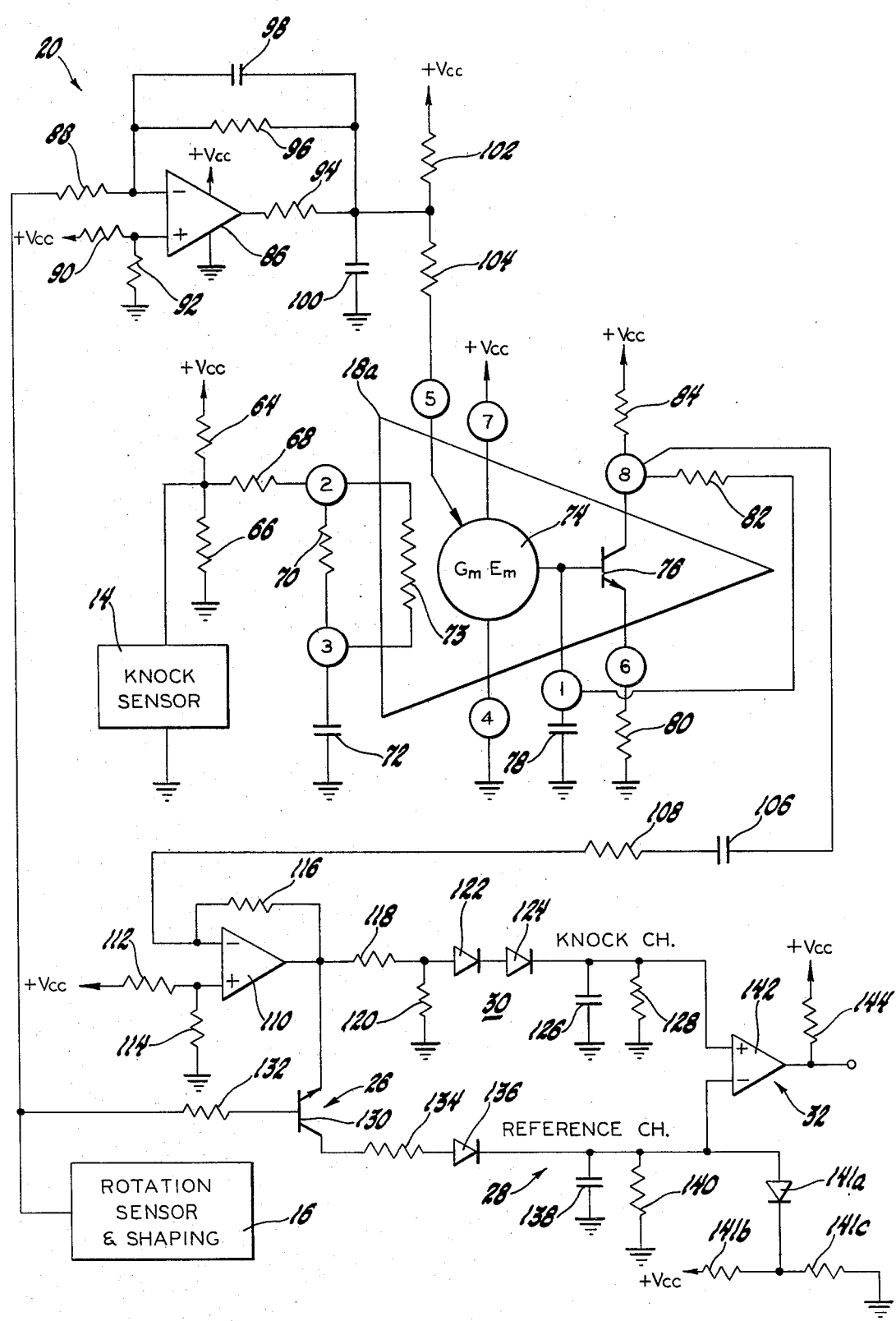

KNOCK DETECTOR FOR INTERNAL COMBUSTION ENGINE

BACKGROUND AND SUMMARY OF THE INVENTION

This invention relates to a knock detector for detecting the occurrence of knock in a spark-ignited internal combustion engine.

The phenomenon of engine knock has long been known to those familiar with internal combustion engines. Engine knock is outwardly manifested by the occurrence of an audible pinging sound. The severity of the knock is reflected by the intensity and/or duration of the pinging sound. Automotive internal combustion engines are designed to operate on fuel of a specified minimum fuel octane rating, and in general an occasional light transitory knock is not objectionable in an internal combustion engine in an automobile. Indeed, compression ratios are selected and spark advance schedules are advanced for automotive internal combustion engines for the purposes of maximizing fuel economy to an extent where under transient operating conditions an occasional light knock may occur. However, more intense and/or more prolonged occurrences of engine knock are definitely undesirable as they have the potential for greatly increasing wear and tear on the engine and even causing major damage to engine-related components. Thus, while an engine may be designed on paper and constructed in the laboratory for knock-free operation, the variables which come into play in actual mass production of a spark-ignited internal combustion engine and in actual use of the engine in an automotive vehicle can give rise to objectionable levels of engine knock. Non-uniformity of gasoline octane, changing ambient conditions, and variations in manufacturing tolerances are among the factors which individually and collectively can adversely affect the engine operation and create knock.

If knock does occur, a proven technique for its alleviation involves an appropriate retarding of the spark timing. Unfortunately, this technique is inconsistent with the objective of increasing fuel economy.

The advent of electronic engine controls on production automotive vehicles offers the possibility for selectively retarding spark timing in response to the detection of incipient, or borderline, engine knock. For example, current electronic spark advance systems electronically adjust the timing of spark ignition as a function of conventional variables such as engine speed and engine load. By adding a suitable knock detector to such a system knock can be detected at borderline levels and spark timing can be automatically retarded to alleviate the knock and thereafter advanced as otherwise scheduled. This means that the fuel economy and emissions benefits can be obtained while knock and its related problems can be avoided.

The present invention in one respect is directed to the provision of such a suitable knock detector.

A study of a number of previous patents reveals that in a general way, knock detectors may be divided into two categories. The first category involves those knock detectors which are utilized to grade and/or blend gasoline. The second category involves those which are employed in actual usage in an automotive engine for over-the-road operation. Examples of patents in the first category are U.S. Pat. Nos. 3,469,954; 3,575,039; and 3,822,538. An example of a patent of the second category is U.S. Pat. No. 4,002,155. Knock detectors in the first category are designed for what basically amounts to a controlled laboratory situation where engine speed may be accurately controlled, where accelerations and decelerations may be slowly, uniformly made, and where fuel octane may be accurately monitored. Such conditions are in marked contrast to the highly dynamic operation of an engine in an automobile where the engine is subject to sudden accelerations and decelerations, a wide range of operational speeds, and where shift points of the transmission coupled to the engine impose sudden extreme transients on the engine, not to mention of course the nonuniformity in octane ratings of gasolines vended at the pump. It is a far easier task to detect engine knock under controlled laboratory conditions than it is in an automobile operating on the road. One problem with previous knock detectors of this first category is that they would appear generally unable to consistently and accurately detect knock if the engine were subjected to the more severe operating conditions to which it would be subjected if in an automobile.

The knock detectors falling into the second category operate to retard spark in response to incipient knock, but in general they seem to contain large amounts of electronic circuitry, and for many of these knock detectors, it is questionable whether they can consistently and accurately detect knock under all transient conditions which may be encountered although in general they represent more resourceful approaches than those of the idyllic first category. Furthermore, mass production requirements dictate that such systems be cost effective, reliable, and adaptive.

The present invention is directed in a further respect to fulfilling a need for a knock detector suitable for mass production which will reliably detect knock in its incipiency under the myriad of different operating conditions which may be encountered in an automobile engine in over-the-road use and which in conjunction with an electronic spark advance system will operate to retard spark to alleviate the knocking tendency and thereafter allow normal spark advance schedules to be resumed for fuel economy and emissions purposes once the knocking as ceased.

Investigations of the engine knock phenomenon have demonstrated that for a given engine model knock-induced vibrations will occur at reasonably well-defined frequencies. For example, in a four-stroke reciprocating piston engine the frequencies at which knock occur appear to be functions of the diameters of the engine cylinders to a first order and the displacement to a second order, and it does not appear that they are functions of knock intensity. Thus, sensors for detecting knock may be mounted on the engine and tuned to monitor the frequency bands in which knock vibrations may be expected. The problem, of course, in detecting knock-induced vibrations at these frequencies is to distinguish them from other engine vibrations also lying within these bands, these latter vibrations constituting noise. Prior patents disclose various approaches to the problem of distinguishing knock signals from background noise in a variety of ways.

At constant or slowly changing engine speeds knock can be detected without sophisticated techniques because it is not as difficult to monitor and compensate for the background noise. For example, it is possible to use an integrator to average background noise and to monitor vibrations against this background noise level. Examples of such detectors would be those first three patents enumerated above. Under dynamic operation, however, more sophisticated detectors are called for because the range of background noise begins to increase and overlap the range of knock signals thereby tending to increasingly mask any engine knock which may occur. Patents of the second category referred to above contain these more sophisticated approaches. While offering various degrees of improvement, many still suffer from the disadvantages described above such as not being able to detect knock under extreme transient conditions or being too expensive, etc. On the other side of the coin, care must be taken in the design of a knock detector to avoid false retarding of spark timing when knock is not in fact present. False retard could be a potential problem with certain types of systems. Thus, it must be appreciated that attainment of a perfect or near-perfect knock detector is not an easy task.

Earlier patents disclose a variety of possible approaches to compensating for background noise. One approach disclosed in U.S. Pat. No. 3,393,557 involves the provision of a knock band channel and an engine noise band channel each of which contains its own band pass amplifier and peak reading circuit. The outputs from the two peak reading circuits are monitored by a differential amplifier to provide an indication of knock. A possible objection to this approach is that it presumes that noise in the passband of the noise channel is the same as noise in the passband of the knock channel and such may not be, and indeed probably is not, the case.

U.S. Pat. No. 2,958,317 incorporates a threshold circuit which is set higher than the valve noise level. Only signals exceeding the threshold are monitored. A problem with this approach is that it is obviously not suited to accommodate the variety of range of conditions which would be encountered in an automobile engine in actual use in an vehicle.

Other patents set a threshold as a function of engine speed; for example, see U.S. Pat. Nos. 4,163,385 and 4,061,116. In U.S. Pat. No. 4,002,155 a background noise level reference is used to establish a threshold and the number of ringings occurring in the vibration signal which exceed the threshold are used to determine whether knock is occurring. This latter patent is also an example of a gated reference where the vibration signal is gated during a portion of the operating cycle when knock vibrations are not expected to occur to thus establish a reference. Other approaches may employ a gated knock where the vibration signal is gated during selected portions of the cycle when knock is expected to occur; for example, see U.S. Pat. No. 2,879,665.

One patent which seems to offer a possibly more effective approach than some of the other patents is U.S. Pat. No. 4,153,020 where the gain of an amplifier receiving the vibration signal is controlled as a function of background engine noise. However, a possible problem is that it may become less effective as the engine becomes worn.

Other approaches are shown in U.S. Pat. Nos. 3,678,732; 3,950,981; 3,822,583; 4,111,035; 2,450,882, and 3,942,359.

The present invention is addressed to a new and improved knock detector which compensates more effectively to unmask engine knock in the presence of engine noise over the dynamic operating ranges encountered in an automobile engine, yet which is also highly immune to false retard of spark timing. While some of the individual techniques embodied in the practice of the invention are per se known in the art, the invention does comprise a novel means which compensates for the adverse influence of background noise on knock detection and which is well suited for an automobile engine on a mass production basis although obviously it is also useful for any type of engine knock detector. The invention is cost effective, is less complicated in circuitry, and very importantly, it achieves a high degree of consistency in accurately detecting incipient knock. Principles of the invention can be applied to various engine models with any required differences in scaling being made by selection of circuit component values. Although a preferred embodiment of the invention is herein disclosed, its principles may obviously be implemented in other embodiments.

In an automobile a constraint on electrical and electronic systems is the available voltage supply. Typically, in today's automobiles, the voltage supply is a 12 volt DC battery. Thus, electronic systems in the vehicle must operate on a supply voltage of somewhat less than 12 volts unless other techniques, such as voltage doubling, are employed. The obvious disadvantage of such other techniques is that they add to the cost and complexity of the system. A typical supply voltage for state of the art electronic circuitry is five volts. This means that in an automobile engine knock detector using such a supply voltage, knock and noise signals being processed in the knock detector must be confined to this limited range over the engine vibrating range if useful information is to be obtained; i.e. saturation must be avoided. Prior systems have utilized integrators, averagers, and/or low pass filters. Some have used variable attenuators. Yet, these approaches are not seen to be capable of providing reliable, accurate knock detection in automotive usage. They may either miss knock or they may falsely detect it.

A very desirable way to detect knock, disregarding background noise for the moment, is by utilizing peak detection. Peak detection allows even a single individual knock vibration to be detected thereby offering the potential for knock to be suppressed in its very incipiency. Peak detection, per se, in the context of an engine knock detector is well known as evidenced by the aforementioned U.S. Pat. No. 3,393,557. Now peak detection by its very nature involves detecting peak voltage. In the laboratory large voltage supplies are readily available and use of peak detection is not foreclosed by voltage supply constraints. Unfortunately, with the overlap in noise and knock signals ranges in an automobile, the use of peak detection appears unattractive in view of the low supply voltage.

The present invention, in a still further respect, makes feasible usage of the peak detection technique in a low voltage system in an automobile, encompassing the range of operational speeds and transients which may be encountered, reliably and accurately detecting knock in its incipiency to retard spark timing and yet allowing spark to be otherwise advanced in timing in accordance with desired schedules at such times as when knock is absent.

While the claims at the conclusion of the ensuing specification define the patented invention, the improvement which the invention provides may be briefly summarized as comprising in a knock detector: a sensor mounted on the engine, tuned to sense mechanical engine vibrations within a frequency band which will contain knock vibrations if knock occurs, and providing a corresponding electrical signal; an amplifier for amplifying the sensor electrical signal; a gated reference channel which receives the amplified signal and gates it to a detection circuit during intervals coincident with the absence of any appreciable engine knock with the detection circuit detecting a selected characteristic of the gated signal; a knock channel which couples the amplified signal to another detection circuit which detects a selected characteristic of the signal; a comparator which compares the detected signals detected by the two detection circuits to provide a knock detection signal in accordance with a predetermined relationship between the two indicative of engine knock; and means for sensing engine speed and attenuating, in accordance with engine speed, the gain of the amplifier such that the gain is in general made an inverse function of engine speed. In the disclosed preferred embodiment the improved knock detector of the invention comprises: a resonantly tuned sensor mounted on the engine and tuned to a frequency band in the vicinity of the six kilohertz range; an amplifier comprising a variable gain operational transconductance amplifier stage for amplifying the sensor signal; a sensor which senses engine speed and a frequency-to-current conversion circuit which converts the sensed frequency representing engine speed into a control current for the operational transconductance amplifier stage which in general increasingly attenuates the gain of the stage with increasing engine speed; a reference channel circuit including a gate which operatively couples the output of the amplifier to a peak detector circuit for peak detecting the amplified sensor signal during gating intervals which are coincident with the absence of any appreciable engine knock; a knock channel circuit which operatively couples the output of the amplifier to another peak detector circuit for peak detecting the amplified sensor signal; and a comparator circuit for comparing the outputs of the two peak detector circuits to provide a knock detection signal in accordance with a predetermined relationship between the two indicative of engine knock. The characteristics of the operational transconductance amplifier and frequency-to-current conversion circuit are selected such that the knock sensor signal is amplified by a factor of eight for engine speeds up to 1000 rpm and between 1000 rpm and 4000 rpm, the gain of the amplifier varies linearly inversely with increasing engine speed to arrive at an ultimate amplification factor of unity at 4000 rpm and remains at unity beyond 4000 rpm. The knock detector may be employed in conjunction with either an analog spark advance system or a digital spark advance system whereby spark timing is retarded in response to detection of incipient knock and thereafter normal spark advance schedules are allowed to resume once the knock has dissipated.

The foregoing features, advantages, and benefits of the present invention, along with additional ones, will be seen in the ensuing description and claims which should be considered in conjunction with the accompanying drawings disclosing a preferred embodiment of the present invention according to the best mode presently contemplated in carrying out the invention.

BRIEF DESCRIPTION OF THE DRAWINGS

FIG. 4 is a diagram of a series of electrical waveforms occuring at selected points in the system.

FIG. 5 is a more detailed electronic schematic diagram of the system of FIG. 1.

FIG. 6 is a portion of an electronic schematic diagram representing a first modification to a portion of the circuit of FIG. 5.

FIG. 7 is a view similar to FIG. 6 representing a second modification.

DESCRIPTION OF THE PREFERRED EMBODIMENT

Figure 1:
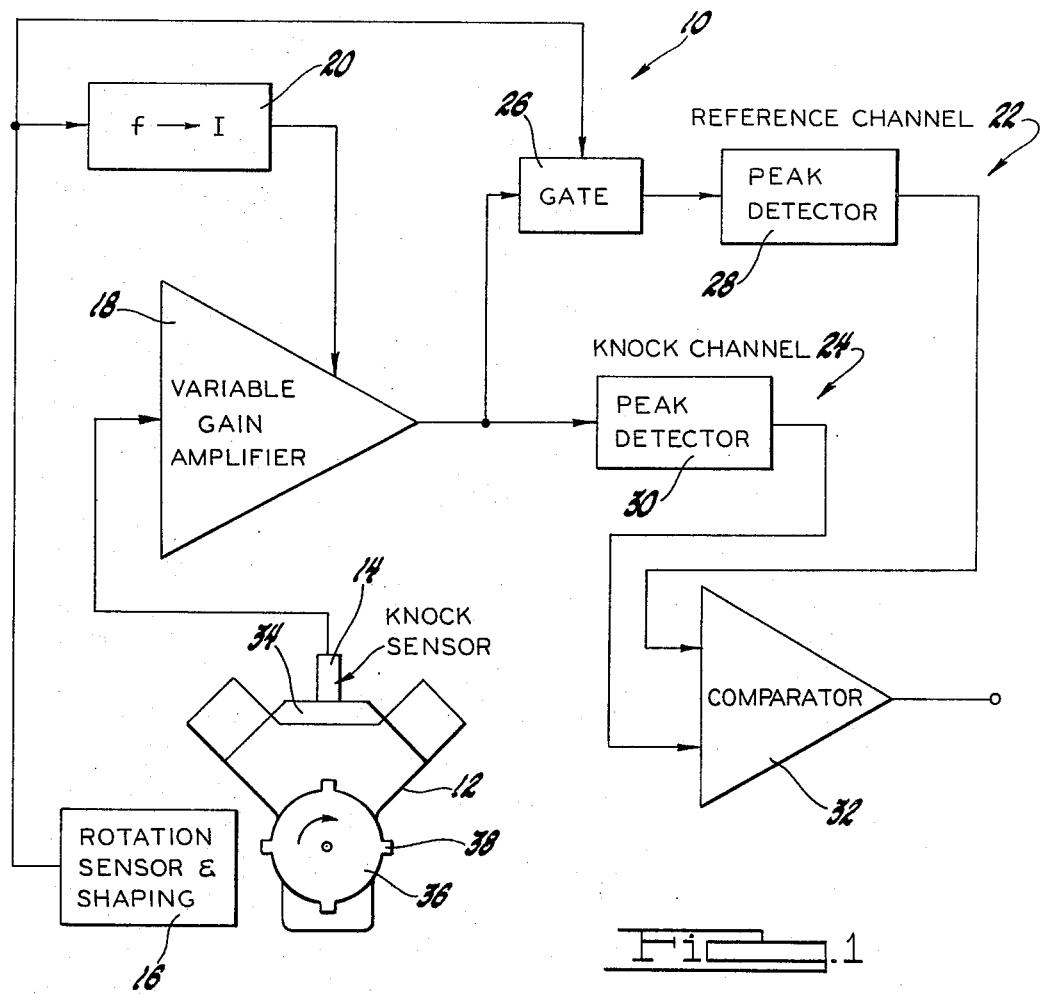
FIG. 1 is a schematic block diagram of a knock detection system embodying principles of the present invention operatively associated with an internal combustion engine.

FIG. 1 illustrates a knock detector 10 embodying principles of the present invention in association with an internal combustion engine 12. The knock detector comprises: a knock sensor 14; a crankshaft rotation sensor and shaping circuit 16; a variable gain amplifier 18; a frequency-to-current conversion circuit 20; a reference channel 22 comprising a gate 26 and a peak detector 28; a knock channel 24 comprising a peak detector circuit 30; and a comparator 32.

Knock sensor 14 mounts on a portion of the engine where knock vibrations are susceptible to detection. It has been found that in certain engines the intake manifold 34 is a suitable location for detecting knock vibrations, although it is possible to detect knock vibrations at other locations. The knock sensor senses mechanical engine vibrations including those in the frequency range within which knock is expected to occur and supplies a corresponding electrical signal to variable gain amplifier 18. Sensor and shaping circuit 16 comprises a pick-up disposed in proximity to a toothed member 36 which rotates with the crankshaft of the engine. The member 36 has teeth 38 disposed at selected locations around its periphery which induce signals in the pick-up. Advantageously, the sensor and shaping circuitry 16 provides both position and speed information. The frequency of the induced signals is directly proportional to engine speed. Because it is desired to operate gate 26 in selected relation to piston position, and because piston position is directly related to crankshaft rotational position, member 36 and its teeth 38 are arranged and constructed in relation to the engine cylinders such that a tooth sweeps past the pick-up to thereby induce a pulse in the pick-up at intervals of crankshaft rotation equal to 720° divided by the number of engine cylinders for a four-stroke reciprocating piston spark-ignited internal combustion engine executing intake, compression, power and exhaust strokes. Further, the pick-up and teeth are relatively related such that the pulses are induced at desired piston positions. Hence, in a V-8 engine a tooth sweeps past the pick-up every 90° of crankshaft rotation to induce a pulse in the pick-up at a desired piston position, with the pulse frequency representing engine speed. In response to each pick-up pulse the associated shaping circuitry produces a rectangular output pulse of fixed time duration. In this way a rectangular waveform signal containing both position and speed information, which will be more fully explained later in connection with the description of FIG. 4, is supplied to both frequency-to-current circuit 20 and to gate 26.

The frequency-to-current conversion circuit 20 monitors the frequency of the rectangular waveform signal received from circuit 16 (the frequency being representative of engine speed) and develops a corresponding output current which is supplied to variable gain amplifier 18. The magnitude of the current output from circuit 20 is inversely proportional to the frequency of the pulses supplied to its input. The current supplied from circuit 20 to amplifier 18 controls the amplifier gain. Hence it will be appreciated that the amplified output signal of amplifier 18 will be increasingly attenuated as a function of increasing engine speed.

The output of amplifier 18 is coupled to reference channel 22 and to knock channel 24. In reference channel 22 gate 26 controls the application of the output signal from amplifier 18 to peak detector circuit 28. The timing of each rectangular pulse from sensor and shaping circuit 16 is such that gate 26 conducts the signal from amplifier 18 to peak detector circuit 28 during the occurrence of each such rectangular pulse. At other times the amplified signal is not conducted to peak detector circuit 28. The times during which the signal is conducted to peak detector circuit 28 are times coincident with the absence of any appreciable engine knock. Thus, during these times, the peak detector monitors the peak of the output signal of amplifier 18 to develop a reference signal. This reference signal is in turn supplied to one input of comparator 32.

The output of amplifier 18 is directly coupled in knock channel 24 to the peak detector circuit 30. At all times, the peak detector circuit 30 monitors the peaks of the output signal of the amplifier 18 to provide a knock channel signal which is supplied to the other input of comparator 32. Thus, the knock channel signal is continuously compared against the gated reference channel signal by comparator 32. There is a predetermined nominal separation between the two signals; however, when a knock pulse occurs, the differential between the two signals received by comparator 32 changes in such a way that the comparator switches to provide an output indication of the occurrence of the knock. The foregoing briefly summarizes the operation of knock detector 10 and provides a background description for the more detailed description which now follows.

Figure 2:
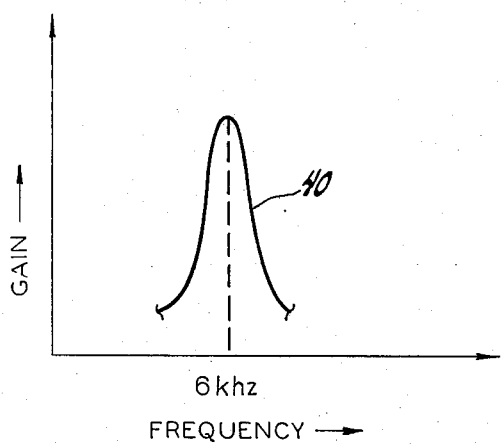
FIG. 2 is a graph plot useful in explaining the operation of the system of FIG. 1.

The preferred knock sensor 14 is a device which is tuned to monitor a predetermined range of frequencies within which knock vibrations are expected to occur. Hence, the device has a gain versus frequency characteristic as illustrated by the reference numeral 40 in FIG. 2. It was mentioned earlier that in a given model of engine knock frequencies at which knock may occur can be predetermined and will be generally consistent from engine to engine in identical engine models. In a Chrysler 318 CID V-8 engine, knock vibrations will occur in the vicinity of six kilohertz and therefore, the knock sensor 14 is tuned to have a peak in the vicinity of the six kilohertz frequency and a relatively narrow band around this center frequency, on the order of perhaps several hundred hertz. Thus, in general, the output signal provided by knock sensor will have principal frequency components in the vicinity of six kilohertz. In addition to knock vibrations, the engine experiences a wide range of vibrations at various frequencies including the frequency range to which the knock sensor 14 is tuned. With respect to a knock signal these other signals constitute background noise. Thus, the task of knock detector 10 is to be able to distinguish a knock pulse from this background noise. If the engine were running at a reasonably constant speed or with very small accelerations and decelerations, the task of distinguishing knock from background noise would be less difficult. However, in an internal combustion engine in an automobile the engine is subjected to a wide range of operating speeds and accelerations and decelerations. Background noise in general becomes increasingly intense as engine speed increases. Accordingly, at higher engine speeds, background noise levels may be well above the level of a knock signal at a lower speed where the background noise level is considerably lower. Thus, there is overlap in the ranges of the knock and noise signals and the task of the knock detector is to reliably and accurately detect occurrence of knock in spite of the extreme operating range to which the engine is subjected. The knock detector of the present invention is directed to providing a means for enabling such reliable and accurate detection to occur in an automobile engine.

The variable gain amplifier 18 amplifies the output signal of knock sensor 14. Accordingly, the output signal at the output of amplifier 18 will essentially duplicate the signal at knock sensor 14 but will have been amplified by an amplification factor which is a function of engine speed.

Figure 3:
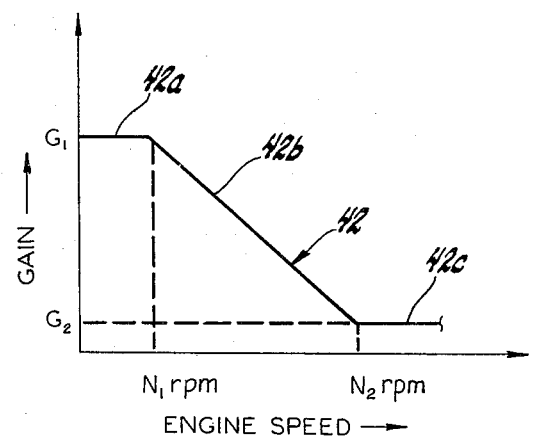
FIG. 3 is another graph plot useful in explaining the operation of the system of FIG. 1.

FIG. 3 illustrates a gain characteristic of amplifier 18 as a function of engine speed, with the signal from circuit 16 having been converted into a corresponding control current by circuit 20. For speeds less than $N_1$ rpm the gain of amplifier 18 remains constant at a factor of $G_1$. Between $N_1$ rpm and $N_2$ rpm the gain of the amplifier decreases linearly as a function of increasing speed from a factor of $G_1$ at $N_1$ rpm to a factor of $G_2$ at $N_2$ rpm. Above $N_2$ rpm the gain remains at $G_2$. This means that the amplified knock sensor signal as amplified by amplifier 18 is increasingly attenuated over the $N_1$ rpm to $N_2$ rpm speed range from its maximum amplification at $N_1$ rpm and below. Stated another way, the amplification factor is higher at lower speeds than it is at higher speeds. In the preferred embodiment $N_1$ equals 1000 rpm; $N_2$, 4000 rpm; $G_1$, 8; and $G_2$, 1.

FIG. 4 illustrates a series of waveforms which are useful in explaining the operation of knock detector 10. The first waveform designated by the reference numeral 44 represents the envelope of the positive peaks of the signal of knock sensor 14. It will be appreciated that all waveforms are merely exemplary for purposes of disclosing principles of the present invention and are not necessarily intended to represent actual waveforms taken from an operative system. The waveform 44 is shown to reside at a nominal background noise level until the occurrence of a knock pulse 46. The knock pulse terminates upon termination of the knock and the signal returns to the background noise level. The illustrated waveform 44 would be for a substantially constant engine speed. As engine speed increases the level of signal would increase, and as speed decreases, the level decreases. The second broken line waveform 48 represents a typical waveform at a reduced engine speed. A knock pulse 50 is shown to occur in the waveform 48 and as will be appreciated the magnitude of the knock pulse 50 does not exceed the background noise level of the waveform 44 at the higher engine speed. This illustrates how the background noise level at higher speeds exceeds the knock signal level at lower engine speeds.

The second waveform of FIG. 4 illustrates the rectangular pulses 52 which are developed by the sensor and shaping circuit 16. The pulses 52 are generated in response to the teeth 38 sweeping past the sensor pickup. Thus, in a V-8 engine, the pulses 52 are separated by 90° of crankshaft rotation. It will be appreciated that as the engine speed increases, the 90° interval becomes compressed in time and hence the frequency of the pulses 52 will correspondingly increase. Because circuit 20 monitors the frequency of the pulses 52 it will be appreciated that the control current to the operational amplifier 18 is a function of the actual engine speed and therefore, the amount by which the amplification of amplifier 18 is attenuated is similarly a function of engine speed. The sensor and shaping circuitry 16 may comprise any suitable means for generating the pulses 52. For example, they could be generated by a microprocessor or they could be generated by a one-shot circuit. The pulses 52 are also supplied to gate 26 for the purpose of gating the amplified output signal from amplifier 18 to the peak detector 28 of the reference channel 22. Each pulse 52 serves to open gate 26 so that the amplified signal output from amplifier 18 is conducted to peak detector 28 during each gating interval. The duration of the pulses 52 are selected to be long enough to allow under the most extreme operating conditions a minimum number of peaks of the amplified knock sensor signal to be passed to peak detector 28 to establish a reference level. Because the gating pulses are timed to occur during selected intervals coincident with the absence of any appreciable engine knock, the peak detector 28 will develop a peak detected signal which corresponds to a background reference level. This peak detected background reference level signal is supplied to one input of comparator 32. The third series of waveforms illustrates the reference channel signal 54 and the knock channel signal 58. During the interval between pulses 52 the reference channel signal will decay slightly and during subsequent gating intervals may rise to the prevailing background level as indicated at 56. The peak detector characteristics are such that the peak detected signal will generally track changes in the amplified signal as the engine operates over its operating range including allowing for the usual accelerations and decelerations. There is provided a sufficient separation between the two signals 54 and 58 so that in the absence of knock the peak detected knock signal does not rise above the background reference level 54. However, when a knock pulse does occur as indicated by the number 60, the level of waveform 58 rises above that of the background noise level causing the comparator 32 to change state. Accordingly, the comparator generates an output pulse 62 as illustrated by the concluding waveform of FIG. 4 which is a knock pulse representing the occurrence of engine knock. The output comprises a pulse such as illustrated at 62 with the pulse duration being indicative of the intensity or severity of the knock.

In an automobile constraints imposed by the available supply voltage present a problem toward accurate and reliable detection of knock over the range of engine speeds which may be encountered. The present invention solves this problem by the provision of decreasing gain with increasing engine speed. In this way, the signals 54 and 58 are in general constrained to lie within the range of the available supply voltage. Hence saturation and other related problems which would cause loss of information are avoided. By attenuating the gain of amplifier 18 as a function of engine speed, the increases in the knock sensor signal amplitude supplied to the input of amplifier 18 which occur as engine speed increases will be attenuated to keep the output signal within the range of available supply voltage. This means that as the engine speed varies, the reference background level as reflected by signal 54 will be kept within available supply range so that any occurrence of a knock pulse can be detected by the change in the inputs to comparator 32. Furthermore, by gating the reference, sustained knock conditions will continue to be detected whereas if the reference channel were continuously coupled rather than being gated, the occurrence of continuous knock would tend to raise the average background noise level to a point where individual knock pulses of sustained knock would not be distinguishable from the average background reference. Furthermore, by maintaining the signal within this range, the desirable peak detection technique may be used.

The detailed electronic schematic diagram shown in FIG. 5 comprises a circuit which couples knock sensor 14 to the input terminals of an operational transconductance amplifier 18a. This circuit, which comprises resistors 64, 66, 68 and 70 and capacitor 72 connected as illustrated, matches the output impedance of the knock sensor with the input impedance 73 of operational transconductance amplifier 18a so that a suitable signal is supplied across the terminals designated 2 and 3 of amplifier 18a. Amplifier comprises eight terminals available for connection of external circuitry which are numbered 1 through 8 inclusive and these numerals correspond to the manufacturer's terminal designations. In FIG. 5 the voltage supply is designated as $+V_{cc}$ and in the preferred embodiment this is a $+5$ volt supply referenced to ground. The equivalent circuit for transconductance amplifier 18a is shown within the operational amplifier symbol. The terminals 2 and 3 constitute the input terminals to which the electrical signal representing engine vibration is applied. The amplifier provides an output signal at terminal 8 which relative to ground is an amplified version of the input signal. Amplification is schematically depicted as comprising a current generator 74 having a characteristic $g_m e_{in}$ and a transistor 76. Various terminals are associated with the current generator 74. These include terminals 7 and 4 which are referenced respectively to $+V_{cc}$ and ground respectively, and terminal 5 which receives the control current signal representative of engine speed. There is a further connection to the base of transistor 76, and the terminals designated by the numerals 1, 6 and 8 respectively are associated with the base, emitter, and collector respectively of transistor 76. A resistor 82 couples the base to the collector by connections at terminals 1 and 8 and terminal 8 is coupled to $+V_{cc}$ through a resistor 84. The operational transconductance amplifier has a gain characteristic such that the transconductance $g_m$ is a function of the current at terminal 5 of the device. By making the current at terminal 5 a function of engine speed, the gain of device 18 becomes a function of engine speed and hence the knock signal applied to the device is amplified by an amplification factor which is also a function of engine speed.

In order to establish the desired relationship between current at terminal 5 and the output signal of sensor and shaping circuit 16, frequency-to-current conversion circuit 20 is configured from a comparator 86, a plurality of resistors 88, 90, 92, 94, 96, 102, 104 and a pair of capacitors 98 and 100 which are connected in circuit as illustrated in FIG. 5 to form an averager, or integrator. The resistors 90 and 92 are connected across the $V_{cc}$ supply to provide a reference voltage to the noninverting input of comparator 86. The signal from circuit 16 is coupled through resistor 88 to the inverting input of comparator 86. The circuit components are selected to provide a characteristic analogous to the graph plot of FIG. 3. Accordingly, the active region corresponds to the engine speed range between $N_1$ and $N_2$ rpm, and in this range circuit 20 functions as an averager, or integrator, to average the signal waveform received from circuit 16. The circuit operates to increasingly sink current at its output as a function of increasing frequency of the input signal and in this way increasing current is diverted from terminal 5 of the operational transconductance amplifier. This in turn causes the transconductance to decrease as a function of increasing engine speed. Below $N_1$ rpm the circuit remains at one limit of its range, and above $N_2$ rpm it remains at the opposite limit.

The amplified version of the knock sensor signal which appears at terminal 8 of the transconductance amplifier is coupled through a serially connected capacitor 106 and resistor 108 to a further circuit comprising an amplifier 110 and resistors 112, 114, 116 connected as illustrated. The two amplifiers 18a and 110 constitute stages which are symbolized by the single amplifier 18 in FIG. 1. The purpose of amplifier 110 is to establish merely a different reference level for the output signal information received from the operational transconductance amplifier 18a.

Both knock and reference channels are coupled to the output of amplifier 110. Gate 26 comprises a transistor 130 with the base of the transistor being coupled to the circuit 16 by a resistor 132. Transistor 130 is thus rendered conductive during occurrences of the pulses 52. The peak detector circuit 28 comprises resistor 134, diode 136, capacitor 138 and resistor 140 connected as illustrated. Diode 136 is poled so as to conduct current to charge capacitor 138 during the gating intervals whenever the positive polarity signal at the output of amplifier 110 is sufficiently high relative to the voltage across capacitor 138 during the gating intervals so charging can take place. Because the output signal at amplifier 110 will follow the electrical signal waveform of the knock sensor representing mechanical engine vibrations, the voltage developed on capacitor 138 will generally reflect the peak values of the vibration signal and hence this is reflected as indicated at 56 in FIG. 4. Resistor 140 serves to bleed charge from capacitor 138 as evidenced by the slowly decaying portions of the waveform 54 which occur between the segments 56. In this way, there is supplied a gated reference signal to comparator 32. As a precaution against a highly unusual condition where extremely prolonged detonation might otherwise occur, a limiter circuit may be added to the reference channel, if desired. In FIG. 5 the limiter comprises a diode 141a and two resistors 141b, 141c connected as shown to limit the maximum signal at the non-inverting input of the comparator to a value where the comparator does not revert to the non-knock state under the extreme condition.

The peak detector 30 of knock channel 24 comprises resistors 118, 120, diodes 122, 124, capacitor 126 and resistor 128 connected as illustrated. The purpose of the resistors 118, 120 and the additional diode 122 is to provide a certain nominal separation between the knock channel signal supplied to comparator 32 and the reference channel signal supplied to comparator 32. With this arrangement capacitor 126 will be charged in such a manner that it in general follows the peaks of the vibration signal appearing at the output of amplifier 110 but with sufficient separation between the knock and reference channel signals during the absence of knock that comparator 32 does not provide a false knock indication signal. Whenever knock pulses actually occur, capacitor 126 will be charged to a peak value which will overcome the separation causing comparator 32 to change state and thereby provide an indication that knock is occurring. Resistor 128 bleeds charge from capacitor 126 so that the capacitor follows the envelope of the peaks.

Comparator 32 is shown to comprise a comparator 142 with the reference channel signal being supplied to the inverting input and the knock channel signal to the non-inverting input. The output of the comparator is pulled up to $+V_{cc}$ through a resistor 144. Thus, whenever knock occurs the output signal appearing at the output of comparator 142 will correspond to the waveform 62 illustrated at the bottom of FIG. 4.

FIG. 6 illustrates an additional circuit arrangement useful in a digital type system. The output from comparator 142 is coupled through a diode 146 to a capacitor 148 such that when a knock indication is given, capacitor 148 will charge through diode 146. Once charged, the capacitor cannot discharge back through diode 146 and thus a continuous indication of knock will be given even after any pulse which caused the knock has disappeared. This allows a digital microprocessor to sample the output across capacitor 148 for being a high or a low logic level representing either a knock or a no knock condition. The microprocessor can supply a clear signal through a circuit comprising capacitor 150, resistor 152 and transistor 154 to discharge capacitor 148 after the information has been sampled.

FIG. 7 depicts still another circuit arrangement useful in a digital microprocessor type system. Basically, the arrangement comprises a pair of cross coupled NOR gates 160, 162 forming a flip-flop. One input of the flip-flop is connected to the output of comparator 142 and the other is connected to receive a clear signal from the microprocessor. Accordingly, when comparator 142 provides an indication of a knock condition, the flip-flop is set and a corresponding signal appears on the output line of the flip-flop. The line is monitored by appropriate circuitry of the system; for example, it may be sampled at given intervals and thereafter the clear signal may reset the flip-flop. Obviously, other circuits may be implemented to monitor the knock detector circuit in a microprocessor type digital system.

Values of the circuit components of the knock detector of the present invention may be selected using conventional engineering techniques. The circuits comprise standard commercially available components and the following component list represents those which have been found useful in a specific preferred embodiment utilized in connection with the aforementioned internal combustion engine. It will be appreciated, however, that although specific values for one embodiment have been disclosed, the principles of the invention are not limited to such values or to the disclosed implementation. For example, it was mentioned earlier that the resistors 118, 120 and the extra diode 122 in the knock channel are used to develop a nominal separation between the signals in the two channels so that this is merely one convenient circuit construction for obtaining such separation if such separation is deemed appropriate for a given embodiment.

It was also mentioned earlier that the crankshaft rotation sensor and shaping circuit 16 performs the dual function of providing both position and speed information. Obviously, it would be possible to practice the invention by using two separate pick-ups, one for gating the reference channel and another for developing a speed signal for control of the variable gain amplifier.

The foregoing discussion is not intended to be inclusive of all possible modifications of the circuitry which may still embody the present invention but is merely intended to explicitly recognize that alternate equivalent circuits may be employed.

The signal output of comparator 142 may be utilized for any desired purpose. Most desirably it is used in conjunction with an electronic spark advance system to retard spark timing when knock occurs. Alternatively it could be used to simply indicate the occurrence of knock. Thus, the invention is useful in any environment where detection of engine knock is desired.

PARTS LIST

| Component | Value |
| --- | --- |
| Resistors 64, 88 | 15K |
| Resistors 66, 92, 114, 141b | 10K |
| Resistor 68 | 12K |
| Resistor 70 | 220 ohms |
| Resistor 80 | 10 ohms |
| Resistor 82 | 9.1K |
| Resistor 84 | 1K |
| Resistor 90 | 56K |
| Resistor 94 | 150 ohms |
| Resistor 96 | 100K |
| Resistor 102 | 750 ohms |
| Resistor 108 | 3.9K |
| Resistors 112, 116, 132 | 20K |
| Resistor 118 | 6.8K |
| Resistors 120, 144 | 33K |
| Resistor 128 | 220K |
| Resistor 134 | 470 ohms |
| Resistor 140 | 3 M |
| Capacitors 72, 106 | .1 µf |
| Capacitor 78 | 470 pf. |
| Capacitor 98 | 2.2 µf |
| Capacitors 100, 138 | .22 µf |
| Comparators 86, 142 | LM 2903 |
| Op Amp 110 | LM 1558 |
| Diodes 122, 124, 136, 141a | 1N914 |
| OP Transconductance Amp 18A | CA3094 |
| +V$_{cc}$ | +5VDC |
| Knock Sensor 14 | 4111526 (Chrysler Part No.) |
| Transistor 130 | 2875915 (Chrysler Part No.) |
| Resistor 141c | 8.2K |

What is claimed is:

1. In a spark-ignited internal combustion engine, means detecting the occurrence of engine knock in the presence of background engine noise comprising:
    means sensing mechanical engine vibrations and generating an oscillatory electrical signal whose amplitude and frequency components correspond to the vibrations within a frequency band which contains knock-induced vibrations if engine knock occurs;
    means amplifying said oscillatory electrical signal by a larger amplification factor at lower engine speeds than at higher engine speeds;
    a knock channel circuit comprising means peak-detecting the amplified version of said oscillatory electrical signal to develop a knock channel signal;
    a reference channel circuit comprising detection means and gating means operable during selected intervals coincident with the absence of any appreciable engine knock to gate the amplified version of said oscillatory electrical signal to said detection means, said detection means comprising means developing from the thusly gated amplified version of said oscillatory electrical signal a reference channel signal;
    and means receiving said knock and reference channel signals and comparing one to the other to provide a knock detection signal in accordance with a predetermined relationship between the two indicative of engine knock.

2. In a spark-ignited internal combustion engine, means detecting the occurrence of engine knock in the presence of background engine noise comprising:
    means sensing mechanical engine vibrations and converting same into a corresponding electrical signal;
    means sensing engine speed and converting same into a corresponding electrical signal;
    means receiving both said electrical signals and developing from them an output signal whose value over a selected range of values of the second-mentioned one of said electrical signals corresponding to a selected range of engine speeds is equal to the value of the first-mentioned one of said electrical signals multiplied by a selected scale factor, over another selected range of values of said second-mentioned electrical signal corresponding to another selected range of engine speeds higher than the first-mentioned selected range of engine speeds is equal to the value of said first-mentioned electrical signal multiplied by another selected scale factor which is less than the first-mentioned selected scale factor, and over a third selected range of values of said second-mentioned electrical signal corresponding to a third selected range of engine speeds between the first two selected ranges of engine speeds is equal to the value of said first-mentioned electrical signal multiplied by selected scale factors between the first two selected scale factors;
    a knock channel circuit comprising a detection circuit which receives said output signal and develops a knock channel signal having a value corresponding to that of a selected characteristic of said output signal;
    a reference channel circuit comprising a detection circuit and gating means operable during selected intervals coincident with the absence of any appreciable engine knock to gate said output signal to the last-mentioned detection circuit during said selected intervals, said last-mentioned detection circuit developing a reference channel signal having a value corresponding to that of a selected characteristic of the thusly gated output signal;
    and means receiving said knock and reference channel signals and comparing one to the other to provide a knock detection signal in accordance with a predetermined relationship between the two indicative of engine knock.

3. In a spark-ignited internal combustion engine, means detecting the occurrence of engine knock in the presence of background engine noise comprising:
    means sensing mechanical engine vibrations and converting same into a corresponding electrical signal;
    means sensing engine speed and converting same into a corresponding electrical signal;
    means receiving both said electrical signals and developing an output signal whose value, over a given range of values of the second-mentioned one of said electrical signals, is equal to that of the first-mentioned one of said electrical signals scaled in inverse proportion to the value of the second-mentioned one of said electrical signals;

a knock channel circuit comprising a detection circuit which receives said output signal and develops a knock channel signal having a value corresponding to that of a selected characteristic of said output signal;

a reference channel circuit comprising a detection circuit and gating means operable during selected intervals coincident with the absence of any appreciable engine knock to gate said output signal to the last-mentioned detection circuit during said selected intervals, said last-mentioned detection circuit developing a reference channel signal having a value corresponding to that of a selected characteristic of the thusly gated output signal;

and means receiving said knock and reference channel signals and comparing one to the other to provide a knock detection signal in accordance with a predetermined relationship between the two indicative of engine knock.

4. In a spark-ignited internal combustion engine, means detecting the occurrence of engine knock in the presence of background engine noise comprising:

means sensing mechanical engine vibrations and converting same into a corresponding electrical signal;

means sensing engine speed and converting same into a corresponding electrical signal;

means receiving both said electrical signals and developing from them an output signal whose value over a selected range of values of the second-mentioned one of said electrical signals corresponding to a selected range of engine speeds is equal to the value of the first-mentioned one of said electrical signals multiplied by a selected scale factor, over another selected range of values of said second-mentioned electrical signal corresponding to another selected range of engine speeds higher than the first-mentioned selected range of engine speeds is equal to the value of said first-mentioned electrical signal multiplied by another selected scale factor which is less than the first-mentioned selected scale factor, and over a third selected range of values of said second-mentioned electrical signal corresponding to a third selected range of engine speeds between the first two selected ranges of engine speeds is equal to the value of said first-mentioned electrical signal multiplied by selected scale factors between the first two selected scale factors;

a knock channel circuit comprising a peak detection circuit which receives said output signal and develops a knock channel signal having a value corresponding to the peak-detected value of said output signal;

a reference channel circuit comprising a peak detection circuit and gating means operable during selected intervals coincident with the absence of any appreciable engine knock to gate said output signal to the last-mentioned peak detection circuit during said selected intervals, said last-mentioned peak detection circuit developing a reference channel signal having a value corresponding to the peak-detected value of the thusly gated output signal;

and means receiving said knock and reference channel signals and comparing one to the other to provide a knock detection signal in accordance with a predetermined relationship between the two indicative of engine knock.

5. In a spark-ignited internal combustion engine, means detecting the occurrence of engine knock in the presence of background engine noise comprising:

means sensing mechanical engine vibrations and converting same into a corresponding electrical signal;

means sensing engine speed and converting same into a corresponding electrical signal;

means receiving both said electrical signals and developing an output signal whose value, over a given range of values of the second-mentioned one of said electrical signals, is equal to that of the first-mentioned one of said electrical signals scaled in inverse proportion to the value of the second-mentioned one of said electrical signals;

a knock channel circuit comprising a peak detection circuit which receives said output signal and develops a knock channel signal having a value corresponding to the peak-detected value of said output signal;

a reference channel circuit comprising a peak detection circuit and gating means operable during selected intervals coincident with the absence of any appreciable engine knock to gate said output signal to the last-mentioned peak detection circuit during said selected intervals, said last-mentioned peak detection circuit developing a reference channel signal having a value corresponding to the peak-detected value of the thusly gated output signal;

and means receiving said knock and reference channel signals and comparing one to the other to provide a knock detection signal in accordance with a predetermined relationship between the two indicative of engine knock.

6. In a spark-ignited internal combustion engine, means detecting the occurrence of engine knock in the presence of background engine noise comprising:

an operational transconductance amplifier having input terminals, a control terminal, and output terminals, and means coupling said terminals for amplifying a signal applied across the input terminals in proportion to control current at the control terminal, with the proportionally amplified signal appearing across the output terminals;

means sensing mechanical engine vibrations and converting same into a corresponding electrical signal which is applied across the input terminals of the operational transconductance amplifier;

means sensing engine speed and converting same into a corresponding control current at the control terminal of the operational transconductance amplifier, with said control current having a value which varies in inverse proportion to engine speed;

a knock channel circuit connected to the output terminals of the operational transconductance amplifier to detect a selected characteristic of the output signal appearing across the output terminals of the operational transconductance amplifier;

a reference channel circuit including gating means for detecting during a selected gating interval which is coincident with the absence of any appreciable engine knock a selected characteristic of the output signal appearing across the output terminals of the operational transconductance amplifier;

and means comparing the respective detected characteristics by the knock and reference channel circuits respectively to provide a knock detection signal in accordance with a predetermined relationship between the two detected characteristics indicative of engine knock.

* * * * *